(12) United States Patent
Matsuura

(10) Patent No.: US 10,381,781 B2
(45) Date of Patent: Aug. 13, 2019

(54) SEALED CONNECTOR WITH SLIDE LEVER ASSISTED MATING

(71) Applicant: Sumitomo Wiring Systems, Ltd., Yokkaichi, Mie (JP)

(72) Inventor: Junya Matsuura, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/893,749

(22) Filed: Feb. 12, 2018

(65) Prior Publication Data
US 2018/0248316 A1    Aug. 30, 2018

(30) Foreign Application Priority Data

Feb. 13, 2017  (JP) ................. 2017-023824

(51) Int. Cl.
| | |
|---|---|
| *H01R 13/629* | (2006.01) |
| *H01R 13/52* | (2006.01) |
| *H01R 13/641* | (2006.01) |
| *H01R 13/627* | (2006.01) |
| *H01R 13/639* | (2006.01) |

(52) U.S. Cl.
CPC ....... *H01R 13/641* (2013.01); *H01R 13/5202* (2013.01); *H01R 13/5205* (2013.01); *H01R 13/629* (2013.01); *H01R 13/6273* (2013.01); *H01R 13/62911* (2013.01); *H01R 13/62938* (2013.01); *H01R 13/639* (2013.01)

(58) Field of Classification Search
CPC ............ H01R 13/629; H01R 13/62911; H01R 13/62916; H01R 13/62922; H01R 13/5202; H01R 13/5205; H01R 13/5213; H01R 13/5219
See application file for complete search history.

(56) References Cited

FOREIGN PATENT DOCUMENTS

JP    2015-69836    4/2015

*Primary Examiner* — Vanessa Girardi
(74) *Attorney, Agent, or Firm* — Gerald E. Hespos; Michael J. Porco; Matthew T. Hespos

(57) ABSTRACT

A connector includes a housing (10) having a flange (31) provided on an outer periphery, a grommet (70) in the form of a resilient tube and to be externally fit on the flange (31), and a slide lever (40) including an operating portion (41) and slide cams (43) projecting from the operating portion (41), supported in the housing (10) and configured to proceed with connection of the housing (10) and the mating housing (100) by the slide cams (43) sliding in the housing (10) due to the pushing of the operating portion (41). The flange (31) includes recessed cuts (34) at outer peripheral locations proximate to the operating portion (41) when the pushing of the operating portion (41) is completed. The grommet (70) includes parts to be fit into the cuts (34).

6 Claims, 15 Drawing Sheets

SEALED CONNECTOR WITH SLIDE LEVER ASSISTED MATING

BACKGROUND

Field of the Invention

The invention relates to a connector.

Description of the Related Art

Japanese Unexamined Patent Publication No. 2015-69836 discloses a connector with a waiting-side housing disposed on a panel and a connection-side housing that is connectable to the waiting-side housing. A slide lever is supported slidably in the connection-side housing. The slide lever includes left and right slide plates, and an operating plate links ends of the slide plates to define a U-shape. A flange protrudes over the entire outer periphery of the connection-side housing. A tubular rubber grommet is mounted onto the connection-side housing and includes a mounting portion to be fit externally on the flange.

The operator lightly connects the connection-side housing to the waiting-side housing and then pushes the operating plate so that the slide plates slide along insertion paths of the waiting-side housing. This movement generates a cam action between the slide plates and the waiting-side housing and pulls the connection-side housing toward the waiting-side housing. The connection proceeds until the housings are connected properly to each other.

The operating plate is near the flange when the housings are connected properly. Thus, fingers of a worker pushing the operating plate may contact the grommet fit on the flange and the worker may stop the pushing operation by feeling a resilient reaction force of the grommet. As a result, the slide lever may never reach a pushing completion position and the housings may not reach a properly connected state.

The invention aims to improve operational reliability of a slide lever.

SUMMARY

The invention is directed to a connector with a housing connectable to a mating housing. A flange is provided on an outer periphery of the housing, and a resilient tubular grommet is fit externally on the flange. The connector also has a slide lever with an operating portion and a slide cam projecting from the operating portion. The slide cam is supported in the housing and is slid in the housing as an operator pushes the operating portion. This sliding movement generates a cam action between the slide cam and the mating housing and causes connection of the housing and the mating housing. The flange includes a recessed cut at an outer peripheral location near the operating portion when the pushing of the operating portion is completed, and the grommet includes a part to be fit into the cut.

With the above-described configuration, the fingers of a worker pushing the operating portion will not contact the grommet, and even if the grommet is contacted, the cut reduces a resilient reaction force of the grommet. Thus, the pushing operation can be continued. As a result, operation of the slide lever is not stopped prematurely, and operation reliability is improved. Further, a positional deviation of the grommet with respect to the housing can be avoided and the mounting of the grommet in an improper posture on the housing can be impeded since the grommet includes the part to be fit in the cut.

A pushing direction of the operating portion may be perpendicular to a connecting direction of the housing and the mating housing. The slide lever may include a narrow portion and a wide portion. The narrow portion may be on the operating portion and may be narrow in the connecting direction. The wide portion may be on a body side of the slide cam and may be wide in the connecting direction via a step extending in the connecting direction. A front part of the wide portion in the connecting direction may be inserted into a receptacle of the mating housing and the narrow portion may be arranged to contact an opening end part of the receptacle of the mating housing when the connection of the housing and the mating housing is completed.

The outer periphery of the flange and the operating portion are near when the pushing of the operating portion is completed. Some installations have strict restrictions on an arrangement space. However, the slide lever includes the narrow portion that is narrow in the connecting direction and the wide portion that is wide in the connecting direction. The front part of the wide portion in the connecting direction is inserted into the receptacle of the mating housing and the narrow portion is arranged to contact the opening end part of the receptacle, as described above. Thus, the slide lever is arranged with good space efficiency in the connecting direction and, even if the arrangement space is limited, such a case can be dealt with.

The part of the grommet to be fit into the cut may be configured as a thick portion thicker than surroundings. According to this configuration, it can be prevented that the part of the grommet to be fit into the cut extends over time.

DETAILED DESCRIPTION

Figure 1:
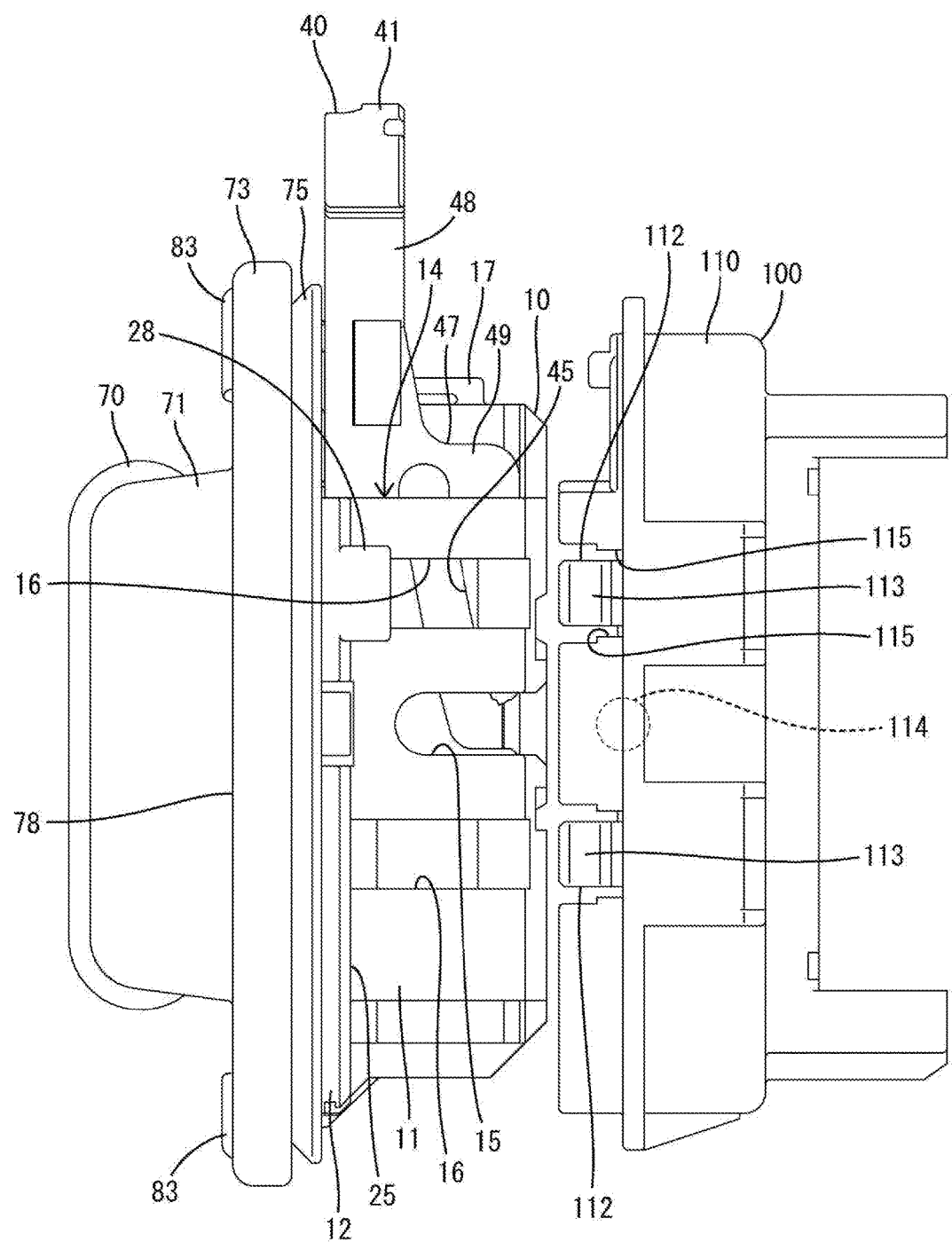
FIG. 1 is a side view of a connector of one embodiment of the invention showing a state where a housing and a mating housing are facing each other at the start of connection.

One embodiment of the invention is described with reference to the drawings. A connector of this embodiment is illustrated as a panel-mounted connector provided in a part of an unillustrated automotive vehicle where a door is disposed, and includes a housing 10, a slide lever 40 and a grommet 70. The housing 10 is connectable to a mating housing 100. Note that, in the following description, surface sides of the housings 10, 100 facing each other at the start of connection are referred to as front sides concerning a front-rear direction, and a vertical direction is based on each drawing.

Figure 10:
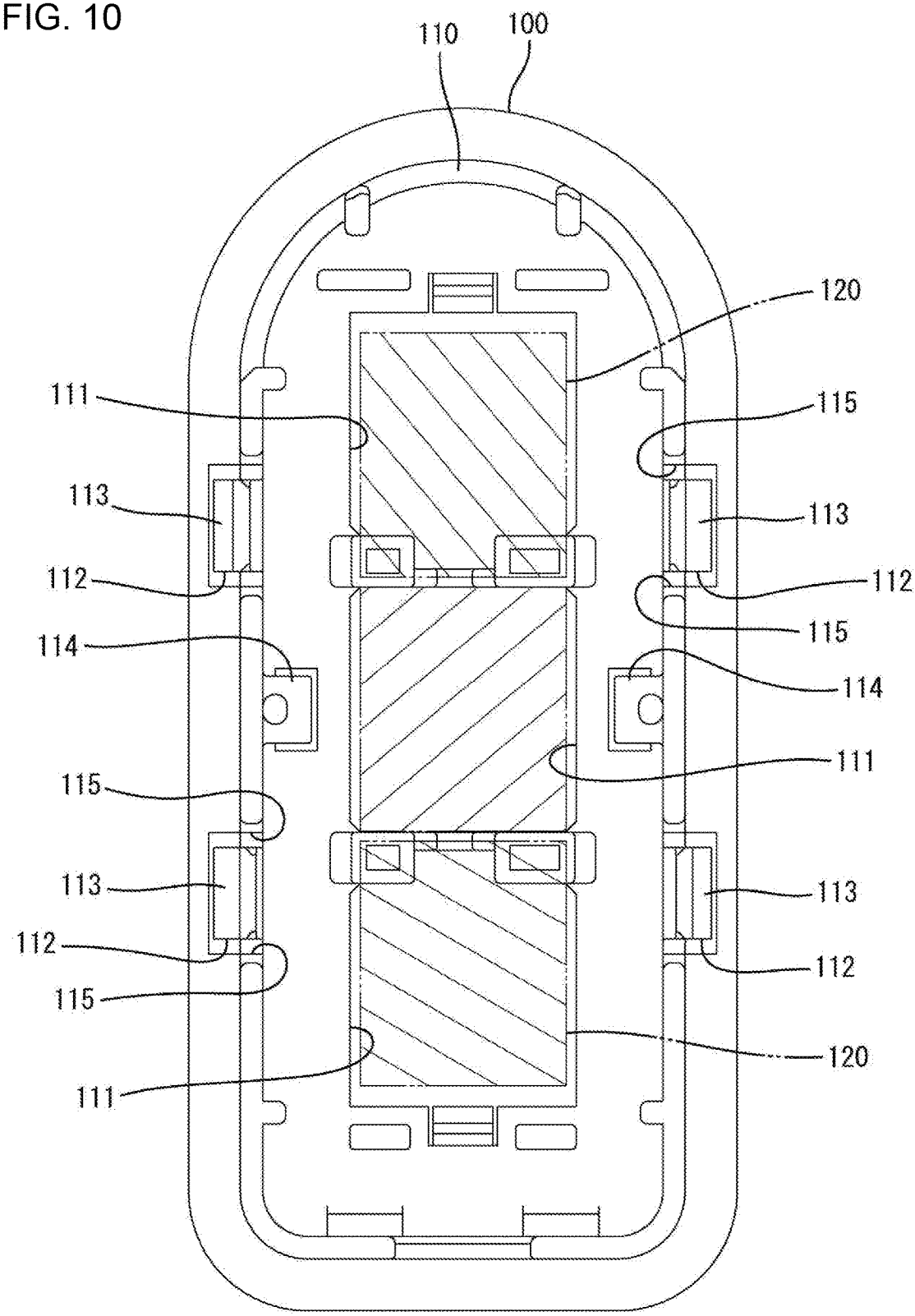
FIG. 10 is a front view of the mating housing.

The mating housing 100 is made of synthetic resin and arranged on a body side of the unillustrated automotive vehicle and includes a receptacle 110 in the form of a box frame long in the vertical direction as shown in FIGS. 1 and 10. Three mating sub-housing accommodation chambers 111 are arranged side by side in the vertical direction in a rear part of the receptacle 110, and a mating sub-housing 120 is inserted and accommodated into each mating sub-housing accommodation chamber 111 from behind. Unillustrated mating terminal fittings are accommodated in each mating sub-housing 120. Each mating terminal fitting is connected to an end part of an unillustrated wire, and each wire is pulled out from the rear surface of the mating sub-housing 120.

Slits 115 extend rearward from a front opening end in each of left and right side walls of the receptacle 110, and a deflectable housing lock 112 is provided between the slits 115 facing each other in the vertical direction. Two upper and lower housing locks 112 are arranged in each of the left and right side walls and each include a lock claw 113 projecting out on a tip.

Further, left and right follower pins 114 projecting in from positions between the pairs of upper and lower housing locks 112 are provided on the left and right side walls of the receptacle 110. Each follower pin 114 has a substantially cylindrical shape and is engageable with a later-described cam groove 45 of the slide lever 40.

Figure 7:
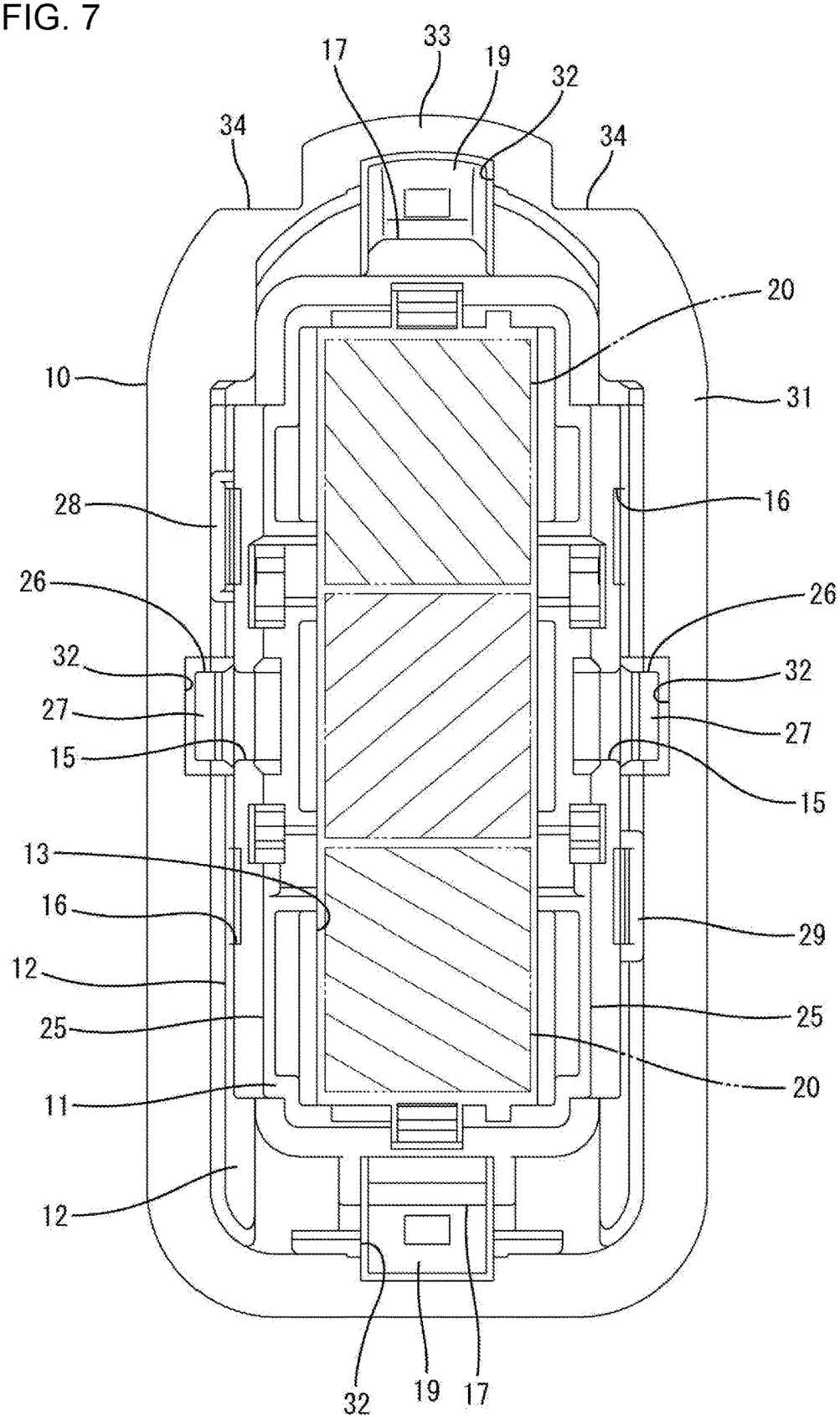
FIG. 7 is a front view of the housing.
Figure 8:
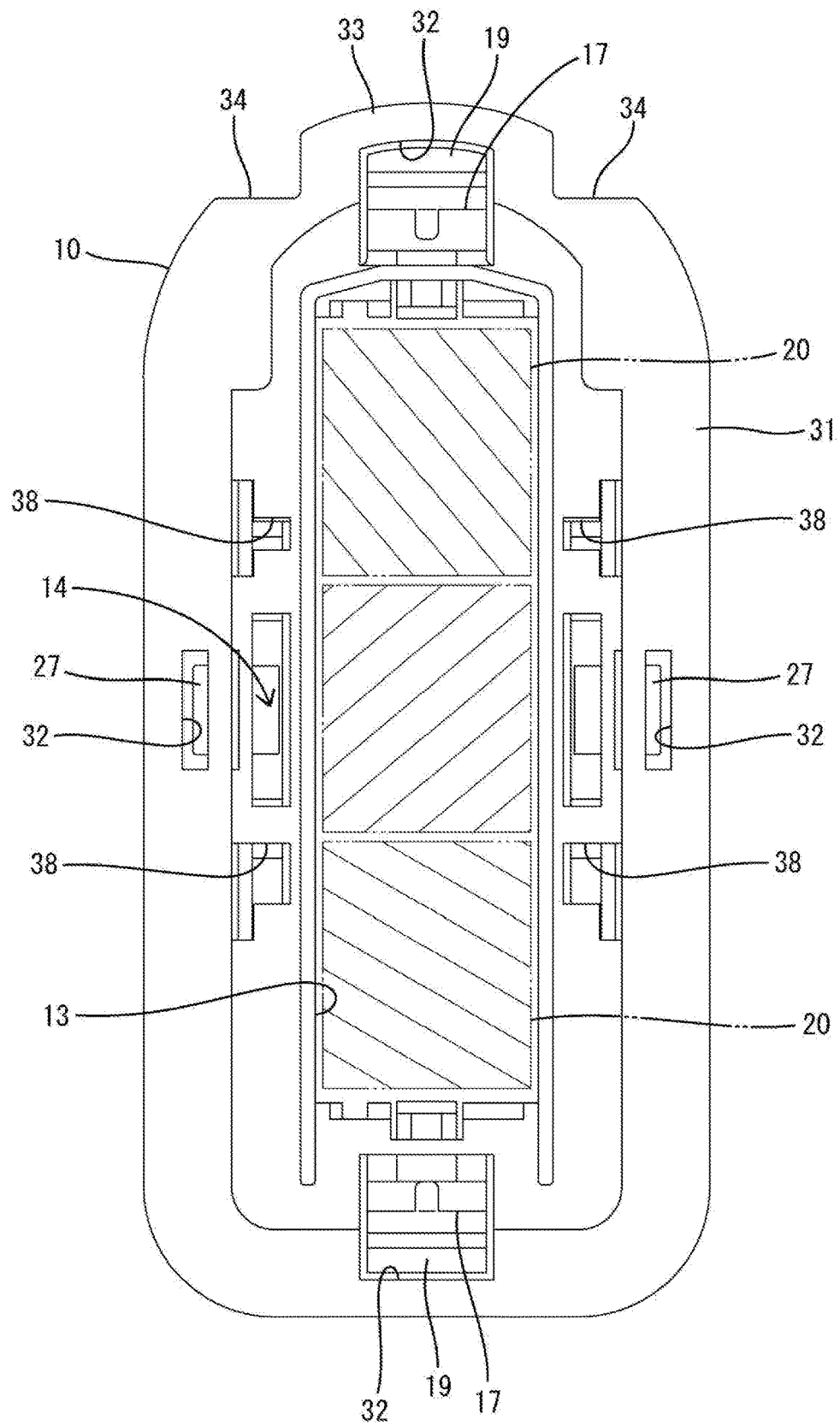
FIG. 8 is a back view of the housing.
Figure 9:
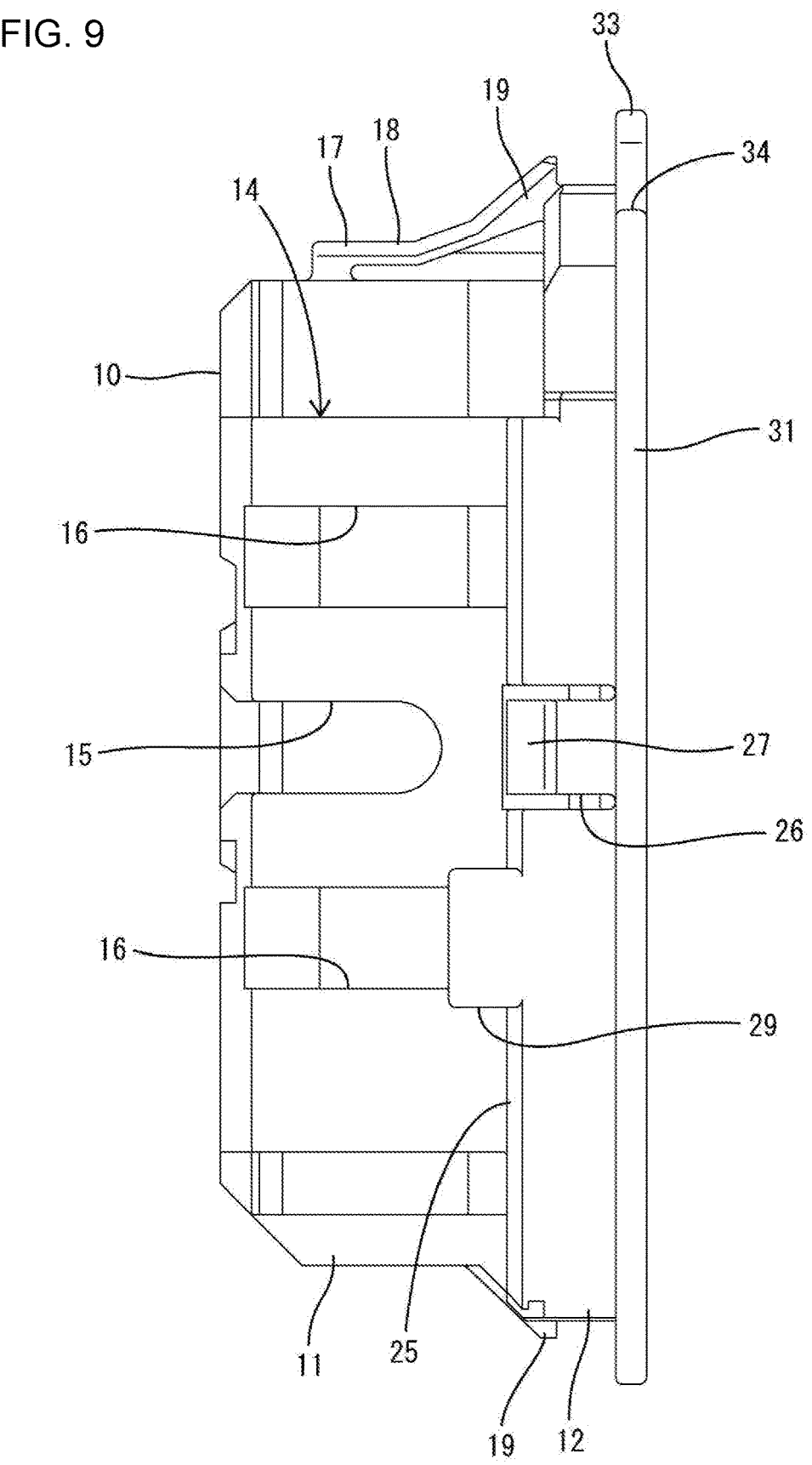
FIG. 9 is a side view of the housing.

The housing 10 also is made of synthetic resin and is arranged on the door of the automotive vehicle. As shown in FIGS. 7 to 9, the housing 10 is a box frame long in the vertical direction and includes a housing body 11 that can fit into the receptacle 110 in a front part and a sealing portion 12 to be covered with the grommet 70 in a rear part. Sub-housing accommodation chambers 13 penetrate through the housing body 11. A sub-housing 20 is inserted into each sub-housing accommodation chamber 13 from behind. Three sub-housings 20 correspond individually to the mating sub-housings 120. Unillustrated terminal fittings are accommodated in each sub-housing 20. Each terminal fitting is connected to an end part of an unillustrated wire, and each wire is pulled out from the rear of the sub-housing 20. In this embodiment, each wire constitutes a harness for supplying power to electrical devices on the door and a pulled-out part is surrounded in a predetermined range by the grommet 70.

Figure 2:
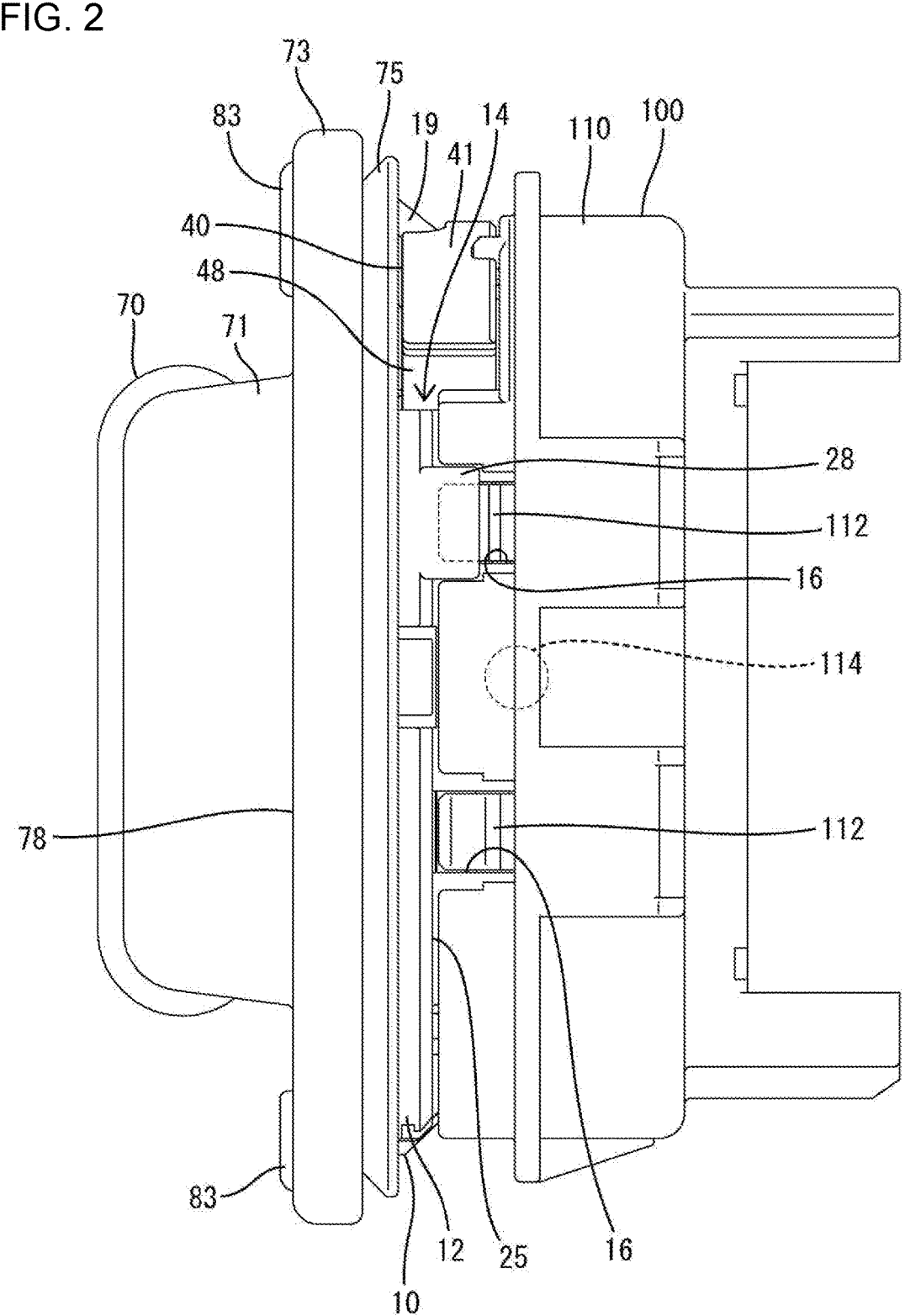
FIG. 2 is a side view showing a state where the housing and the mating housing are properly connected to each other.

The left and right side walls of the housing body 11 are arranged to stand along the vertical direction and constitute inner and outer double wall structures across slide spaces 14 penetrating in the vertical direction. An introducing groove 15 is provided in a vertically central part of each of the left and right side walls of the housing body 11 by cutting off an outer wall part, and escaping grooves 16 are provided above and below the introducing groove 15. Each introducing groove 15 extends in the front-rear direction and is open on the front end of the outer wall part. The escaping grooves 16 also extend in the front-rear direction and are open on both front and rear ends of the outer wall part. When the housings 10, 100 are connected, the follower pins 114 are inserted into the introducing grooves 15 and the housing locks 112 are inserted into the escaping grooves 16 to escape (see FIG. 2).

Figure 3:
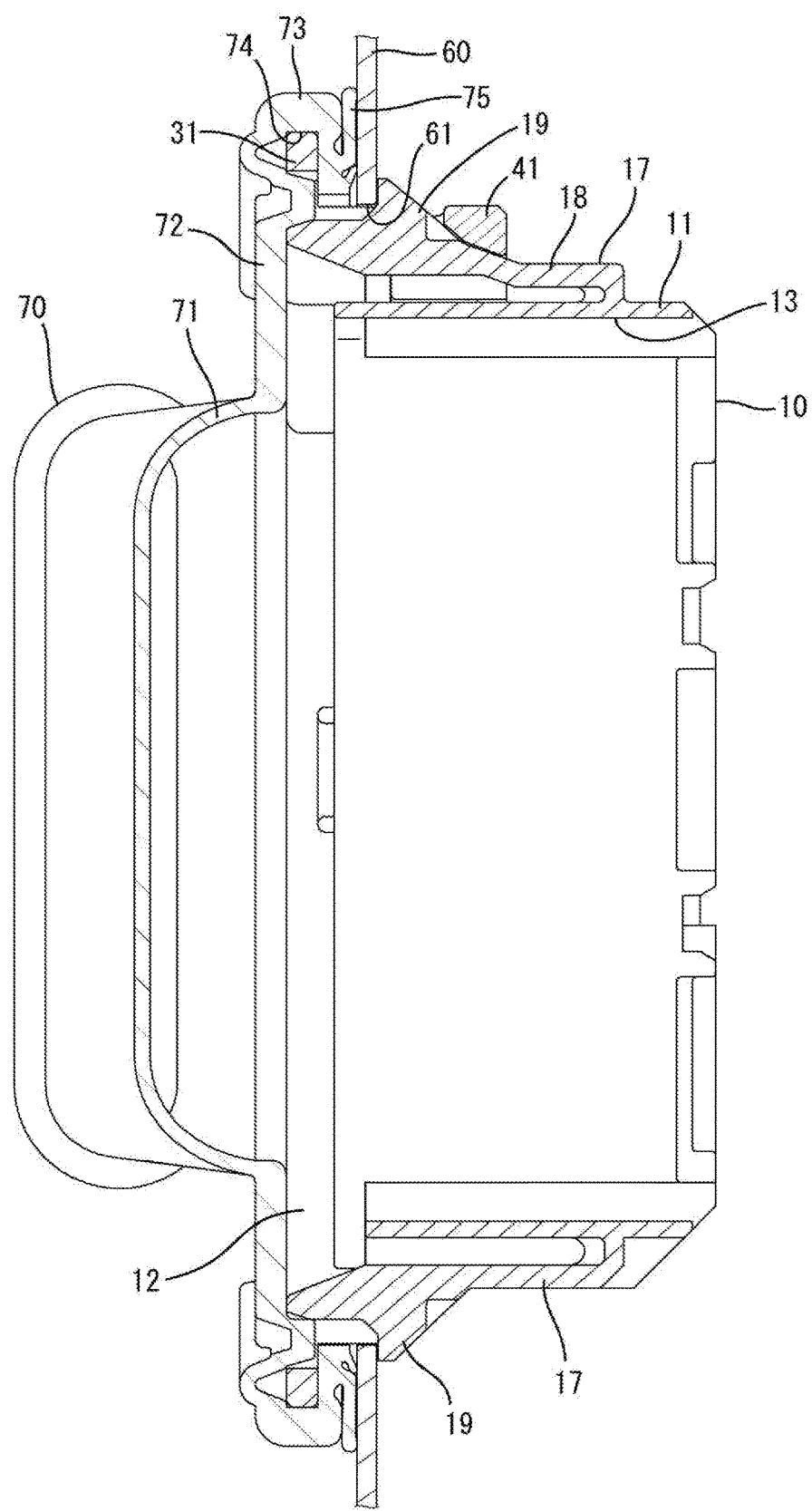
FIG. 3 is a side view in section showing the housing mounted on a panel.

Two lock arms 17 are provided on upper and lower walls of the housing body 11. As shown in FIG. 3, the lock arms 17 are cantilevered rearward from the outer surfaces of front parts of the upper and lower walls and are deflectable and deformable in the vertical direction with the outer surfaces of the front parts of the upper and lower walls serving as supports. The lock arm 17 includes an arm body 18 in the form of a plate extending along a lateral direction. A rear end part of the arm body 18 penetrates through a through hole 32 of a later-described flange 31 provided in the sealing portion 12 and reaches a rear end part of the housing 10.

Figure 4:
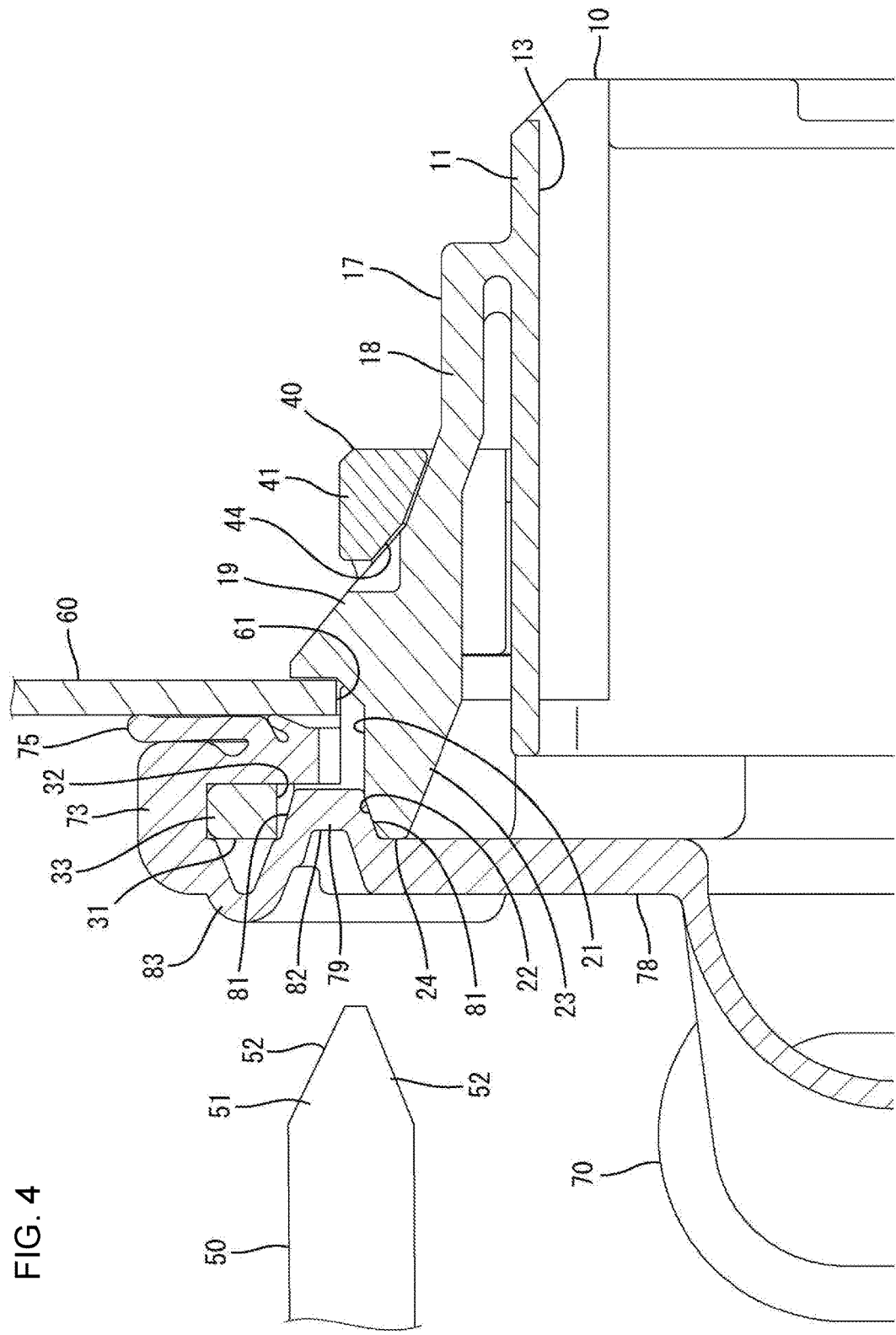
FIG. 4 is an enlarged section of a lock arm and peripheral parts thereof in FIG. 3.

As shown in FIG. 4, the arm 18 includes an inclined part inclined out toward the rear from an intermediate position of the outer surface thereof in a projecting direction and a claw-like lock projection 19 continuous with the inclined part and projecting out. Further, the outer surface of the arm body 18 has a flat surface 21 extending rearward from the lock projection 19 along the front-rear direction and an inclined surface 22 inclined in from the flat surface 21 in a rear part. The inclined surface 22 and the flat surface 21 form a part of the lock arm 17 constituting an unlocking portion 23 to be pressed at the time of unlocking. The inclined surface 22 is inclined at an angle with to the vertical direction and the front-rear direction and faces up and rearward when the lock arm 17 is in a natural state. Note that the rear surface of the arm body 18 is a vertical surface 24 arranged along the vertical direction from the inclined surface 22 and is at substantially the same position as the rear surface of the flange 31 in the front-rear direction.

As shown in FIG. 7, the outer surfaces of left and right side walls of the sealing portion 12 are located slightly outward of the outer wall parts of the housing body 11 via steps 25 extending in the vertical direction. Two side lock arms 26 are provided in vertically central parts of the left and right side walls of the sealing portion 12. As shown in FIG. 9, each side lock arm 26 is between upper and lower cuts formed in the side wall behind the introducing groove 15 and is cantilevered forward to a front end part that faces the step 25. A claw-like side lock projection 27 projects out on a front end part of the side lock arm 26.

As shown in FIG. 7, eave-like upper and lower housing lock receiving portions 28 and 29 are provided on the left and right side walls of the sealing portion 12. The upper housing lock receiving portion 28 protrudes forward from the step 25 and covers the upper escaping groove 16 from the outside. The lower housing lock receiving portion 29 also protrudes forward from the step 25 and covers the lower escaping groove 16 from the outside. When the housings 10, 100 are connected properly, the lock claw 113 of the upper housing lock 112 is inserted into the upper housing lock receiving portion 28 to be locked resiliently (see FIG. 2), and the lock claw 113 of the lower housing lock 112 is inserted into the lower housing lock receiving portion 29 to be locked resiliently. In this way, the housings 10, 100 are held in a connected state.

As shown in FIG. 7, the flange 31 protrudes over the entire periphery on the outer periphery of the rear end of the sealing portion 12. The flange 31 is a jaw that is thin in the front-rear direction. Outer ends of both left and right sides of the flange 31 are arranged vertically, an outer end of a lower part is arranged laterally, and an outer end of an upper part is curved arcuately up except at cuts 34 to be described later.

Through holes 32 are provided behind the side lock projections 27 to penetrate through left and right sides of the flange 31 by the passage of molds for the side locks 27, and through holes 32 also are provided behind the lock projections 19 to penetrate through both upper and lower sides of the flange 31 by the passage of molds for the lock arms 17.

Beam-like restricting portions 33 are provided in the upper and lower parts of the flange 31 to close and define the through holes 32 on both upper and lower sides from outside. The inclined surfaces 22 of the lock arms 17 are located inside the through holes 32 on the upper and lower sides, as shown in FIG. 4, the restricting portions 33 face the inclined surfaces 22.

As shown in FIGS. 7 and 8, two recessed cuts 34 are provided at both left and right sides of the upper lock arm 17 on the outer end of the upper part of the flange 31. The cut portion 34 has a substantially L-shaped cross-section with a vertical side part extending vertically and a lateral side part extending laterally to open up and laterally. When the slide lever 40 is at an initial position, an operating portion 41 is arranged above and away from the cuts 34. When the slide lever 40 is at a connection position to be described later, the operating portion 41 is arranged in proximity to the cuts 34.

Figure 11:
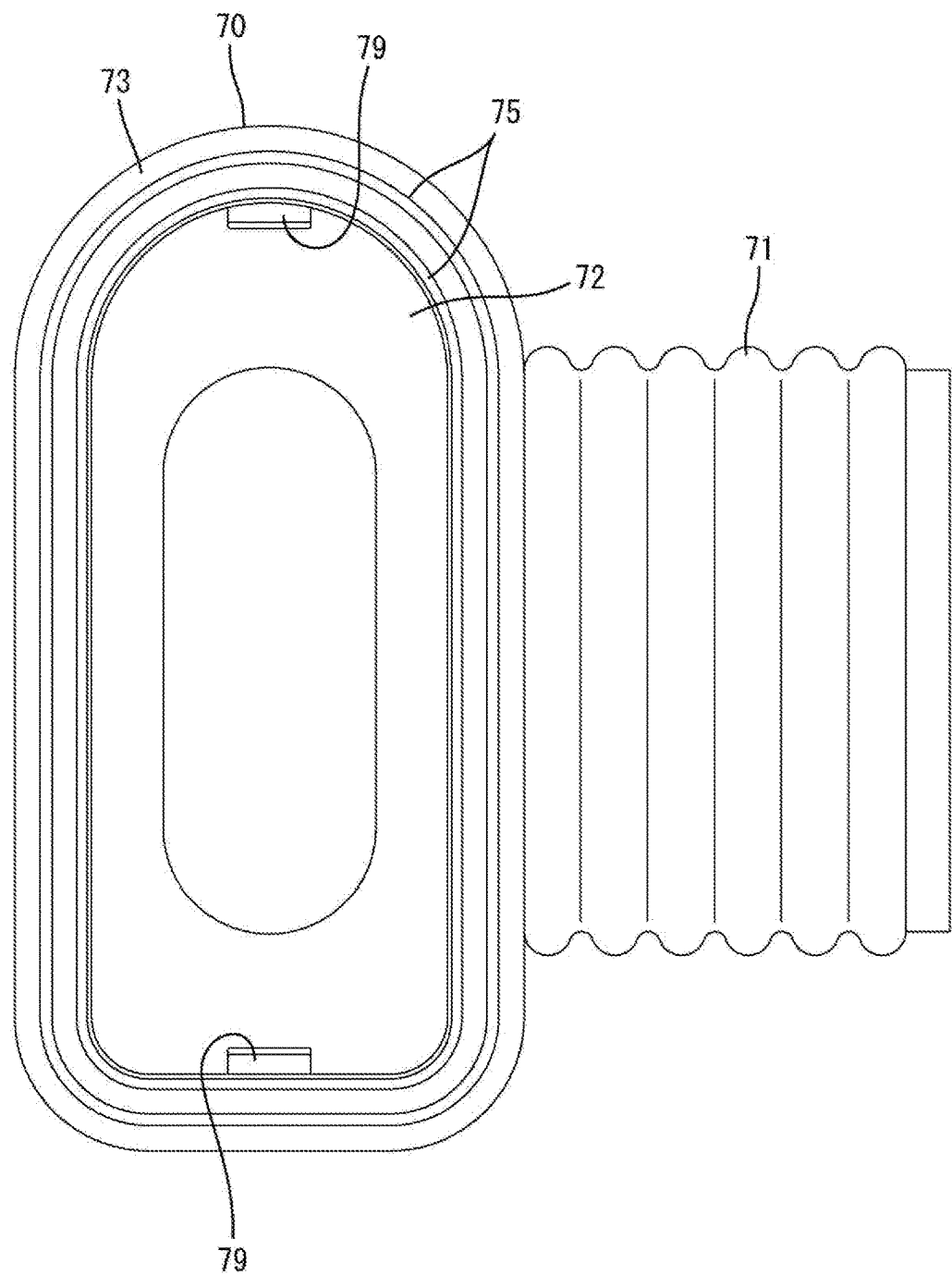
FIG. 11 is a front view of the grommet.
Figure 12:
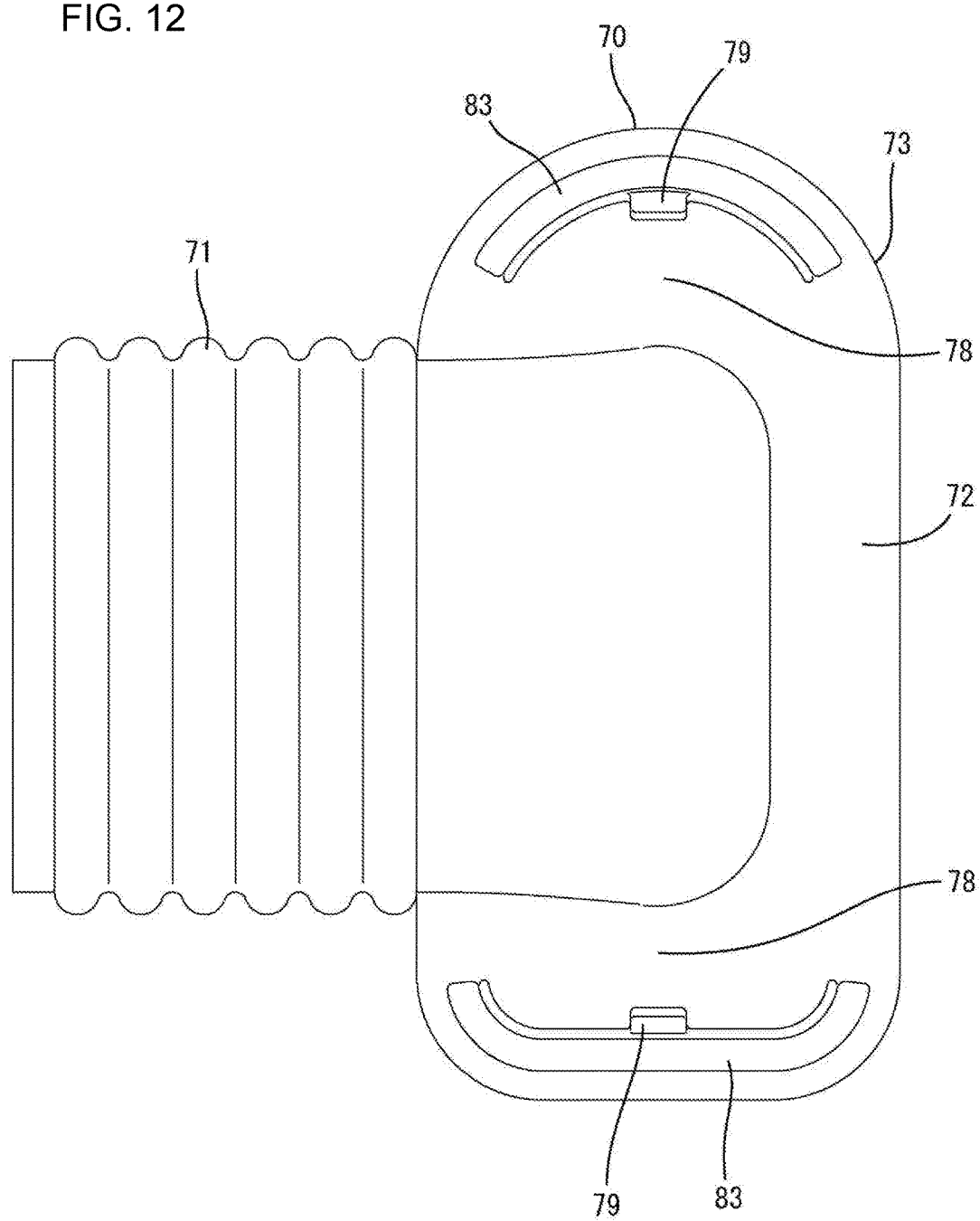
FIG. 12 is a back view of the grommet.

The grommet 70 is a resilient tubular body made of rubber and, as shown in FIGS. 11 and 12, is composed of an extending portion 71 and a body 72. The extending portion 71 is in the form of bellows extending in the lateral direction. The body 72 is a widened tube connected at an angle to one lateral end side of the extending portion 71 and opens forward. Wires pulled out from the housing 10 are inserted collectively into the extending portion 71 and drawn out to outside from an opening on the other lateral side.

A cover 73 is provided on an opening end part of the body 72 and is to be fit externally on the flange 31 over the entire periphery. As shown in FIG. 3, the cover 73 is provided with an inwardly open fitting groove 74 into which the flange 31 can fit, and two inner and outer lips 75 to be held resiliently in close contact with a plate surface of a panel 60 disposed on the door of the automotive vehicle are provided to project on a front surface.

Figure 6:
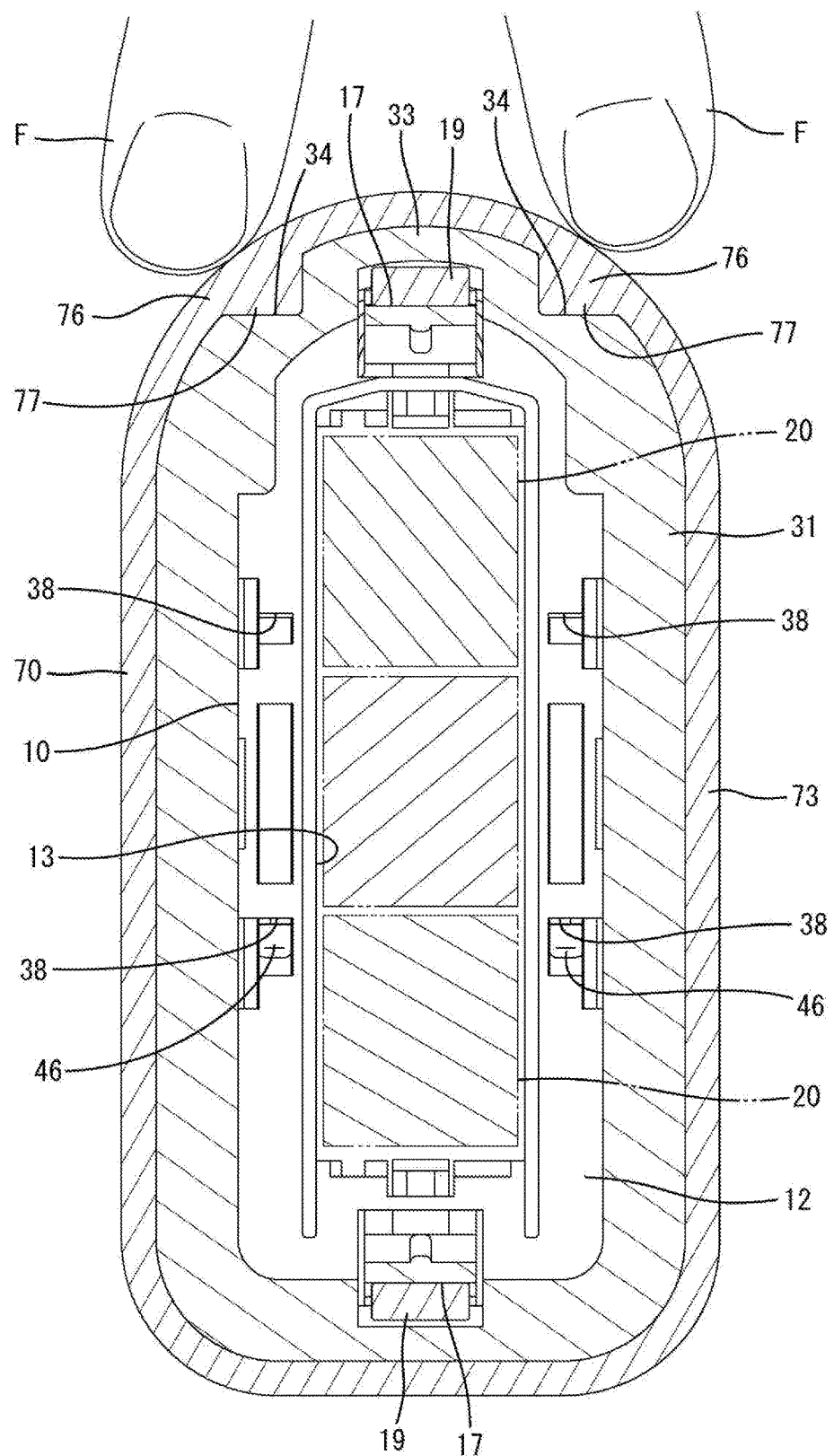
FIG. 6 is a front view in section showing fingertips of a worker in contact with thick portions of a grommet when the pushing of an operating portion is completed.

As shown in FIG. 6, an outermost peripheral part of the cover 73 covering the outer end of the flange 31 includes thick portions 76 thicker than adjacent surrounding parts at locations corresponding to the cuts 34 and is configured to have a substantially uniform thickness in a circumferential direction except at the thick portions 76. Each thick portion 76 includes a fitting protrusion 77 having a substantially right triangular cross-section to be fit resiliently and closely to the cut 34 of the flange 31. An outer end of the outermost peripheral part of the cover 73 is continuous without any step over the entire periphery including the thick portions 76.

The rear surface of the body 72 is a vertical surface 78 along the vertical direction from one lateral end of the extending portion 71 to the outer end of the cover 73. As shown in FIG. 12, the vertical surface 78 of the body 72 is provided with two operating recesses 79 at locations on both upper and lower sides including the cover 73. As shown in FIG. 4, the operating recesses 79 bulge forward and can cover the inclined surfaces 22 of the unlocking portions 23 of the lock arms 17 from outside by entering the upper and lower through holes 32.

The operating recess 79 is in the form of a recessed groove along the lateral direction when viewed from the side of the vertical surface 78 (pressing operation side as described later) and has a substantially U-shaped cross-sectional shape in a side view. More specifically, as shown in FIG. 4, the operating recess 79 is composed of upper and lower (inner and outer) tapered slopes 81 inclined toward each other toward the front and a coupling 82 that couples the front ends of the slopes 81 and extending along the vertical direction. The lower slope 81 of the operating recess 79 is inclined substantially at the same angle as the inclined surface 22 of the unlocking portion 23 with respect to the front-rear direction and the vertical direction and can come into contact along the inclined surface 22.

The vertical surface 78 of the body 72 has two extension allowing portions 83 at locations on both upper and lower sides including the covering 73 and adjacent to and around the operating recesses 79, as shown in FIG. 12. The extension allowing portion 83 bulges rearward, contrary to the operating recess 79, as shown in FIG. 4, and is slackened to be separated from the rear surface of the flange 31. Specifically, as shown in FIG. 12, the extension allowing portions 83 laterally on both upper and lower sides of the vertical surface 78 of the body 72 when viewed from behind, and laterally central parts thereof continuously extend along the outer peripheries of the operating recesses 79. More specifically, the extension allowing portions 83 extend parallel to the outer ends of the upper and lower parts of the covering 73 when viewed from behind. The upper extension allowing portion 83 is curved and the lower extension allowing portion 83 is straight except at bent parts on both left and right ends.

Figure 13:
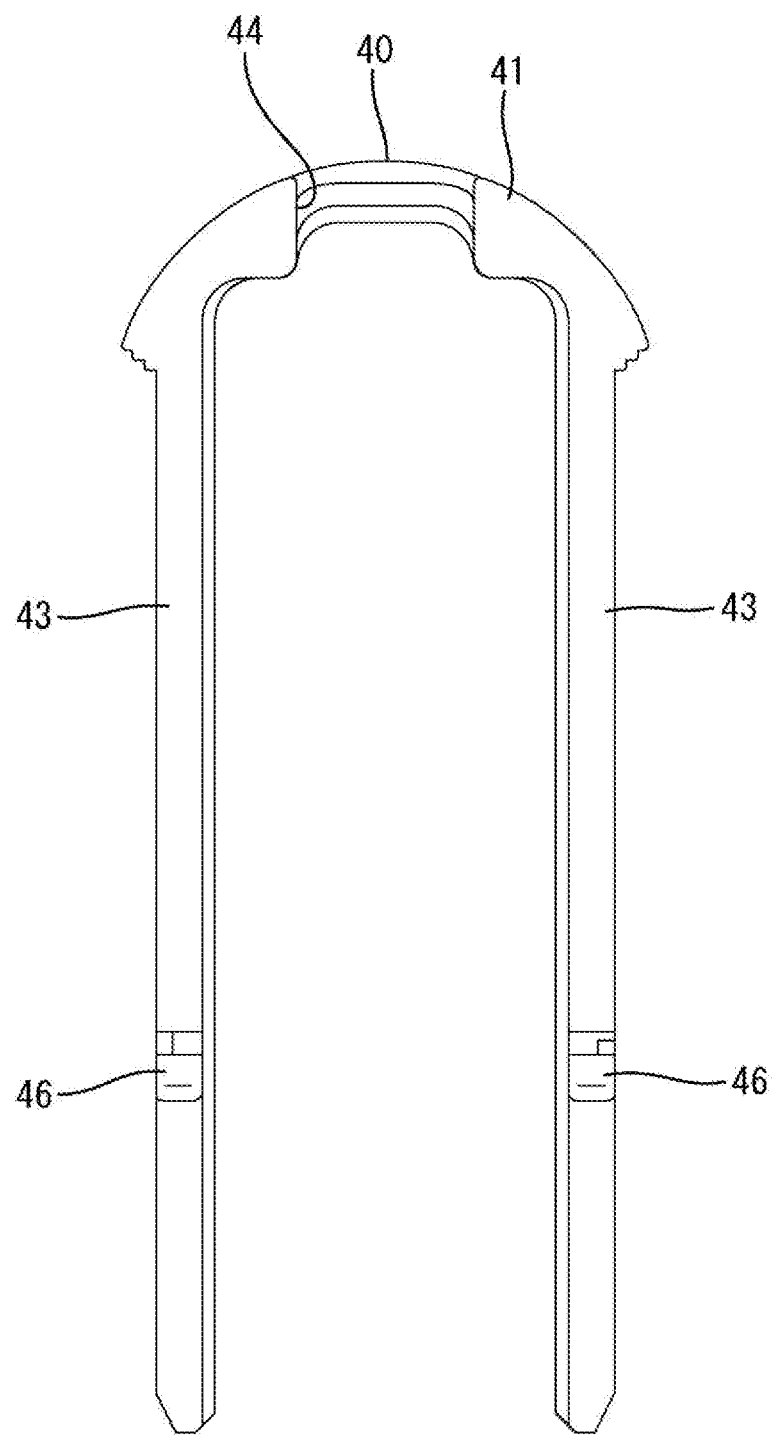
FIG. 13 is a front view of a slide lever.
Figure 14:
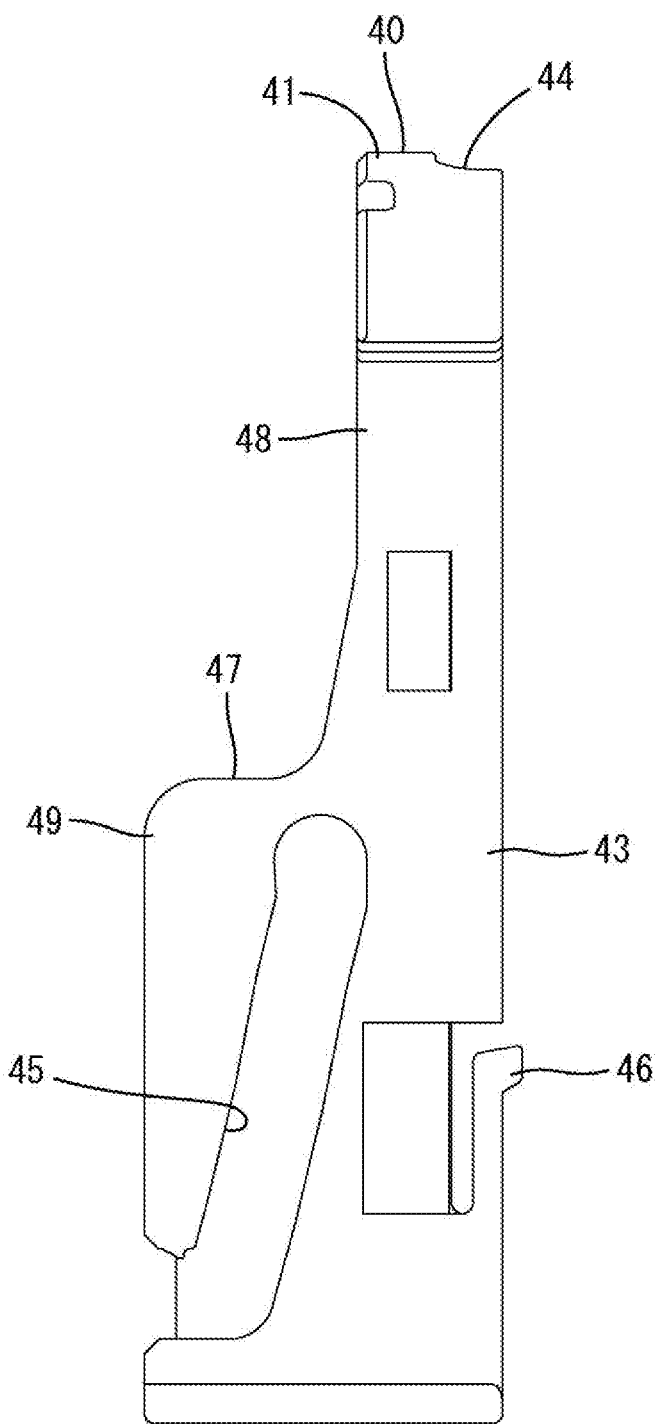
FIG. 14 is a side view of the slide lever.

The slide lever 40 is a plate made of synthetic resin and, as shown in FIGS. 13 and 14, has the operating portion 41 extending in the lateral direction and two slide cams 43 projecting down in parallel from both left and right regions of the operating portion 41 to define a U-shape. The slide lever 40 is mounted from above to straddle the housing body 11, and supported vertically movably with respect to the housing 10 between the initial position where the operating portion 41 is separated up from the housing body 11 and the connection position where the operating portion 41 is proximate to the housing body 11 with the slide cams 43 inserted in the slide spaces 14 of the housing 10.

As shown in FIG. 13, the upper surface of the operating portion 41 has an upwardly convex arc shape and is curved substantially with the same curvature as the outer end of the upper part of the cover 73. The left and right end parts of the operating portion 41 project farther out than the slide cams 43. A laterally central part of the operating portion 41 is cut into a recess from a lower surface to a rear surface to provide an escaping portion 44. As shown in FIG. 4, when the slide lever 40 is at the connection position, an intermediate part of the arm body 18 including the lock projection 19 is inserted into the escaping portion 44 to escape.

As shown in FIG. 14, the slide cams 43 have forwardly open cam grooves 45. Each cam groove 45 is a bottomed groove open in the outer surface of the slide cam 43. Rear end parts of both slide cams 43 are straight along the vertical direction, and lower parts are cut to provide resilient locking pieces 46. The resilient locking pieces 46 are locked resiliently to upper and lower lock receiving portions 38 (see FIG. 6) provided in the sealing portion 12 of the housing 10. The slide lever 40 is held at the initial position or connection position with respect to the housing 10 with movements thereof restricted.

Further, as shown in FIG. 14, the slide lever 40 includes steps 47 extending along the front-rear direction in vertically central parts of the slide cams 43, narrow portions 48 narrow in the front-rear direction on an upper side where the operating portion 41 is located and wide portions 49 wide in the front-rear direction on a lower side where the cam grooves 45 are located via the steps 47. The narrow portion 48 includes a part having substantially the same width in the front-rear direction as the operating portion 41 and connected to the operating portion 41 without any step. The wide portion 49 has a part protruding farther forward than the narrow portion 48 via the step 47, and the cam groove 45 is disposed in that protruding part. At the initial position, the narrow portions 48 are arranged to be exposed above the slide spaces 14 (see FIG. 1). At the connection position, parts of the narrow portions 48 except the operating portion 41 are inserted in the slide spaces 14 (see FIG. 2).

Next, functions of the connector of this embodiment are described.

In assembling, the cover 73 of the grommet 70 is fit on the flange 31 of the housing 10 and the sealing portion 12 is covered by the grommet 70. The grommet 70 is positioned in the circumferential direction on the housing 10 by fitting and inserting the fitting protrusions 77 of the thick portions 76 into the corresponding cuts 34, thereby avoiding a situation where the grommet 70 is mounted in a wrong mounting posture on the housing 10 (see FIG. 6).

Further, the slide lever 40 is held at the initial position with respect to the housing 10 (see FIG. 1). In that state, the housing body 11 is inserted into the receptacle 110 of the mating housing 100 and the follower pins 114 of the mating housing 100 enter the cam grooves 45. The operating portion 41 then is pushed down and displaced toward the connection position. Thus, the slide cams 43 slide in the slide spaces 14 and the follower pins 114 slide on groove surfaces of the cam grooves 45. By achieving a cam engagement between the slide lever 40 and the mating housing 100 via the follower pins 114 in this way, the housing 10 is pulled toward the mating housing 100 and the connection of the housings 10, 100 proceeds.

In the process of moving the slide lever 40 toward the connection position, fingers F (fingertips) of a worker are placed on the upper surface of the operating portion 41 and a downward pushing force is applied to the operating portion 41. The worker places the fingers F on both left and right sides of the operating portion 41 due to the presence of the escaping portion 44.

When the slide lever 40 enters a final stage of the connecting operation, the fingers F of the worker may contact the outer end of the upper part of the covering portion 73 of the grommet 70 (see FIG. 6). If the fingers F of the worker contact the grommet 70, the worker feels a resilient reaction force of the grommet 70 and may stop the pushing operation of the slide lever 40 at this stage. However, in this embodiment, the cuts 34 are provided on the outer end of the upper part of the flange 31. The cuts 34 are near the operating portion 41 and the fingers F of the worker pushing the operating portion 41 are located above the cuts 34 and can contact the upper surfaces of the thick portions 76. Thus, the resilient reaction force of the grommet 70 does not become exceptionally large and the worker can continue to push the slide lever 41.

When the slide lever 41 reaches the connection position, the operating portion 41 contacts the upper surface of the housing body 11 and the intermediate part of the arm body 18 including the lock projection 19 is inserted into the escaping portion 44 of the operating portion 41. Further, the resilient locking pieces 46 of the slide lever 40 are locked resiliently to the lower lock receiving portions 38 of the housing 10 (see FIG. 6). Further, the follower pins 114 reach back sides of the cam grooves 45, the housing body 11 is fit to a proper depth into the receptacle 110 and each terminal fitting is connected electrically to the corresponding mating terminal. In this way, the worker can visually, audibly and tactilely reliably recognize that the slide lever 40 has reached the connection position.

With the housings 10, 100 properly connected, front parts (protruding parts) of the wide portions 49 of the slide cams 43 are inserted in the receptacle 110 and the narrow portions 48 of the slide cams 43 are interposed and sandwiched between the receptacle 110 and the housing 11 to be proximate to and able to contact the opening end part of the receptacle 110. Thus, the slide lever 40 is arranged between the housings 10, 100 with good space efficiency (see FIG. 2).

The housing 10 then is mounted on the panel 60. At this time, the housing 10 is inserted together with the mating housing 100 into a mounting hole 61 and the slide lever 40 passes through the mounting hole 61 during insertion. If the slide lever 40 has not reached the connection position, the operating portion 41 contacts the front surface of the panel 60 to impede insertion of the housing 10 and to indicate that the slide lever 40 has not reached the connection position. Further, at a final stage of insertion, the lock projections 19 and the side lock projections 27 interfere with the panel 60 and the lock arms 17 and the side lock arms 26 are deflected and deformed inward.

When the housing 10 is mounted properly on the panel 60, the lips 75 of the grommet 70 are resiliently held in close contact with an opening end part of the mounting hole 61 on the front surface of the panel 60 over the entire periphery and sealing is provided between the panel 60 and the housing 10 in a liquid-tight manner (see FIG. 3). Further, when the housing 10 is mounted properly on the panel 60, the lock arms 17 and the side lock arms 26 resiliently return and the lock projections 19 and the side lock projections 27 are arranged to face and be lockable to an opening end part of the mounting hole 61 on the back surface of the panel 60. In this way, the housing 10 is held together with the mating housing 100 on the panel 60.

Figure 5:
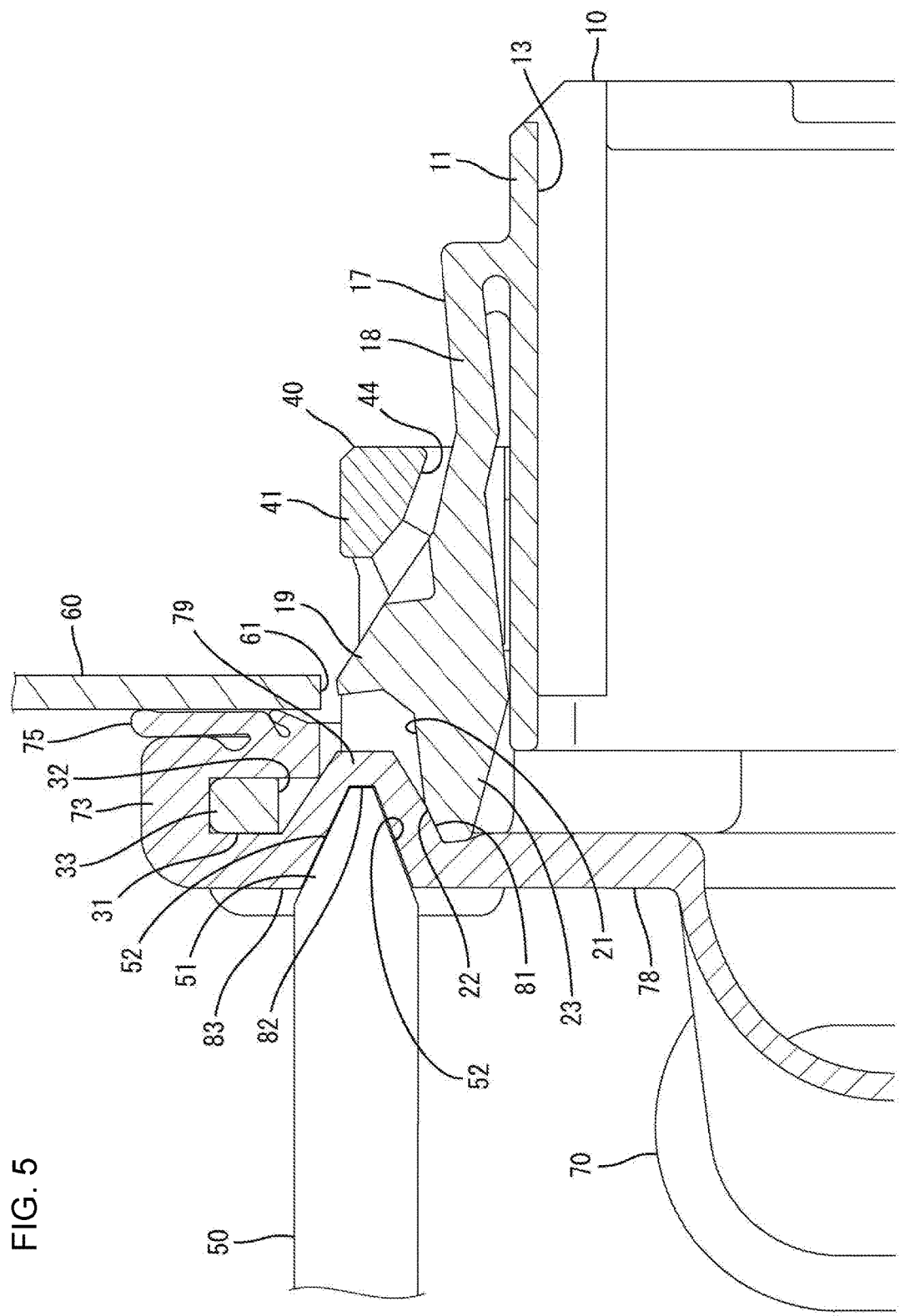
FIG. 5 is an enlarged section showing an operating body pressing an operating recess from a state of FIG. 4.

On the other hand, in removing the housing 10 from the panel 60 for maintenance or other reasons, the operating body 50 shown in FIG. 4 is utilized to deflect and deform the lock arm 17 inwardly in an unlocking direction from the panel 60. As shown in FIG. 4, the operating body 50 is a long narrow linear tab and has operating surfaces 52 tapering a tip 51. The operating body 50 is moved forward with an axial center oriented in the front-rear direction. Thus, the tip 51 is inserted into the operating recess 79 in a depth direction from behind, and the operating surfaces 52 contact the slopes 81 of the operating recess 79. Further forward movement of the operating body 50 causes a forward pressing force to act on the coupling 82 of the operating recess 79 and an inward component of the force acts via the operating surfaces 52 and the slopes 81 in a cam manner. The inclined surface 22 of the unlocking portion 23 faces the slopes 81 and also is pressed inward by the inward component of the force (see FIG. 5). At this time, the tip 51 of the operating body 50 receives an outward resilient reaction force from the side of the lock arm 17, but an outward displacement of the operating body 50 is restricted since the restricting portion 33 faces in an acting direction of that resilient reaction force.

In this way, the lock arms 17 are separated from the opening end part of the mounting hole 61 of the panel 60 to release a locked state. In that state, the housing 10 is pulled rearwardly to be separated from the panel 60.

The operating recess 79 is deformed resiliently by inserting the tip 51 of the operating body 50 into the operating recess 79. Therefore, the amount of deformation of the operating recess 79 is absorbed by the extension of a slackened part of the extension allowing portion 83 toward the rear surface of the flange 31 (see FIG. 5). Thus, the deformation of a peripheral area (area other than the extension allowing portion 83) of the operating recess 79 of the cover 73 following the operating recess 79 is restricted and the smoothness of the deforming operation of the operating recess 79 is secured.

As described above, the operating recess 79 is concave when viewed from the pressing operation side. Thus, a space on the pressing operation side (space behind the vertical surface 78 of the grommet 70) is not restricted by the operating recess 79 and space efficiency is excellent. Further, a pressing force applied to the operating recess 79 is converted into a force in the unlocking direction by the inclined surface 22 of the unlocking portion 23. Thus, a direction of the pressing operation need not be aligned with the unlocking direction and, in addition, the lock arm 17 easily can be deflected and deformed in the unlocking direction only by a one-action operation of inserting the operating body 50 in the depth direction of the operating recess 79. Therefore operability is excellent.

Further, since the cover 73 is provided with the slackened extension allowing portions 83 around the operating recesses 79, the extension of the cover 73 is allowed by the extension allowing portions 83 and reliability in pressing the operating recesses 79 can be improved.

Further, the flange 31 is provided with the through holes 32 in which the unlocking portions 23 and the operating recesses 79 are arranged and the restricting portions 33 for restricting displacements toward an outer peripheral side of the operating bodies 50 for pressing the operating recesses 79 at positions facing the inclined surfaces 22 on outer peripheral parts of the through holes 32. Thus, displacements of the operating bodies 50 toward the outer peripheral side are restricted by the restricting portions 33. This can secure the stability of inserting postures of the operating bodies 50 and a state where the operating bodies 50 press the unlocking portions 23 in the unlocking direction via the inclined surfaces 22 can be ensured.

Furthermore, the flange 31 includes the recessed cuts 34 at the outer peripheral locations proximate to the operating portion 41 when the pushing of the operating portion 41 of the slide lever 40 is completed, and the grommet 70 includes the parts to be fit into the cuts 34. Thus, even if the fingers F of the worker pushing the operating portion 41 contact the grommet 70, the resilient reaction force of the grommet 70 is reduced by the cuts 34 and the pushing operation of the slide lever 40 can be continued. As a result, the operation of the slide lever 40 is not interrupted halfway and operation reliability can be improved.

The grommet 70 includes the parts to be fit into the cuts 34. Thus, there is no positional deviation of the grommet 70 with respect to the housing 10, and the grommet 70 is assured of being in a proper posture on the housing 10. In addition, the parts of the grommet 70 to be fit into the cuts 34 are the thick portions 76 that are thicker than surroundings. These parts of the grommet 70 that fit into the cuts 34 will not extend over time.

The pushing direction of the operating portion 41 is perpendicular to the front-rear direction (connecting direction of the housing 10 and the mating housing 100). The slide lever 40 includes the narrow portions 48 that are on the side of the operating portion 41 and are narrow in the front-rear direction. The wide portions 49 are on the body sides of the slide cams 43 and are wide in the front-rear direction via the steps 47 extending in the front-rear direction. Front parts of the wide portions 49 are inserted into the receptacle 110 of the mating housing 100 and the narrow portions 48 are arranged to contact the opening end part of the receptacle 110 of the mating housing 100 when the connection of the housings 10, 100 is completed. Thus, the slide lever 40 is arranged with good space efficiency in the front-rear direction. As a result, the connector can be installed in a small arrangement space on the door of the automotive vehicle.

Other embodiments of the present invention are briefly described.

The part of the grommet to be fit into the cut may be bent to have a U-shaped cross-section to conform to the recessed shape of the cut. This can make the worker's fingers less likely to contact the grommet.

Figure 15:
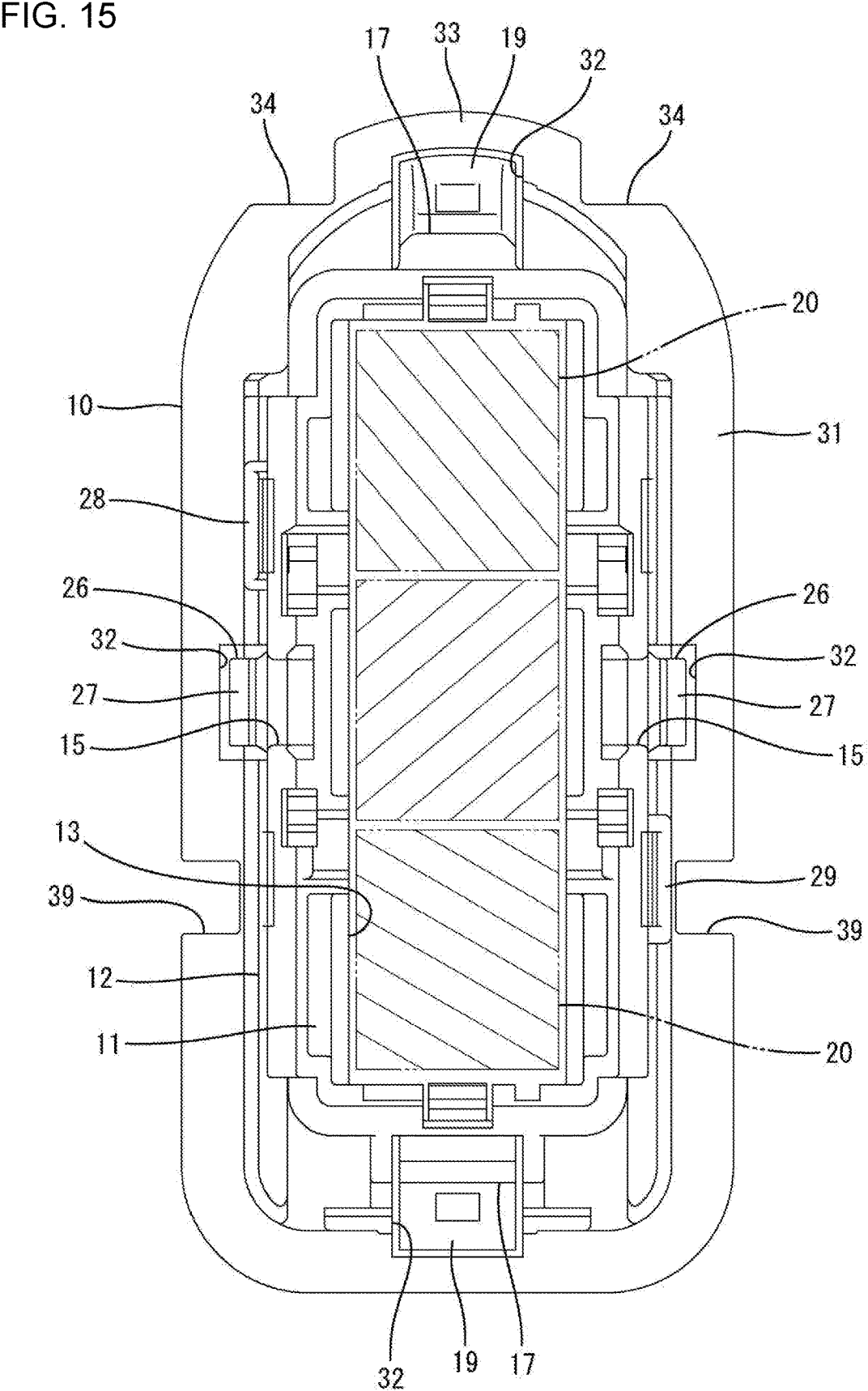
FIG. 15 is a front view of a housing in another embodiment.

The flange may include a recessed cut at a location other than the cut portions, and the grommet may include a part to be fit into that cut. For example, if two cuts 39 in the form of rectangular recesses are provided in long side parts on both left and right sides of the flange portion as shown in FIG. 15, reliability in avoiding a positional deviation of the grommet with respect to the housing can be enhanced further.

The operating body may be a finger (fingertip) of the worker.

The tip of the operating body may be configured to unlock the lock arm substantially in two actions by moving forward and being displaced down from a state inserted in the operating recess. Also in this case, since a pressing amount in the unlocking direction can be reduced by the inclined surface of the lock arm, operability is good.

The invention is applicable to connectors not to be mounted on a panel. In such a case, the lock arm only has to have, for example, a function of holding the mating housing and the housing in the connected state.

LIST OF REFERENCE SIGNS

10 . . . housing
17 . . . lock arm
22 . . . inclined surface
23 . . . unlocking portion
31 . . . flange
32 . . . through hole
33 . . . restricting portion
34 . . . cut
40 . . . slide lever
41 . . . operating portion
43 . . . slide cam
47 . . . step
50 . . . operating body
70 . . . grommet
73 . . . cover
76 . . . thick portion
79 . . . operating recess
83 . . . extension allowing portion
100 . . . mating housing
110 . . . receptacle

What is claimed is:

1. A connector, comprising:
a housing having a front end connectable to a mating housing along a connecting direction and a rear end opposite the front end, the housing including a flange projecting out on an outer periphery of the housing in directions transverse to the connecting direction, the flange having a front face facing toward the front end of the housing and a rear face opposite the front face, the housing further having opposite side walls, slide spaces being formed along the respective side walls and having an opening end in proximity to the flange;
a grommet in the form of a resilient tube, the grommet being fit externally on the flange; and a slide lever including an operating portion and slide cams projecting from the operating portion, the slide cams of the slide lever being supported slidably in the slide spaces of the housing and being configured to proceed with connection of the housing and the mating housing by sliding in the housing due to a pushing of the operating portion with the slide cam engaged with the mating housing; wherein:

the flange includes at least one recessed cut extending through the flange from the front face to the rear face at an outer peripheral location proximate to the operating portion when the pushing of the operating portion is completed; and the grommet includes at least one thick portion thicker than surrounding portions of the grommet and being configured to be fit into the at least one recessed cut.

2. The connector of claim 1, wherein the flange is of substantially uniform thickness from the front face to the rear face at all locations on the flange.

3. The connector of claim 1, wherein the at least one recessed cut comprises first and second recessed cuts, and the at least one thick portion comprises first and second thick portions fit respectively in the first and second recessed cuts.

4. The connector of claim 1, wherein the opposite side walls are spaced from one another in a width direction, the at least one recessed cut comprising first and second recessed cuts spaced from one another in the with direction, and the at least one thick portion comprises first and second thick portions fit respectively in the first and second recessed cuts.

5. A connector, comprising:
a housing connectable to a mating housing, the housing including a flange on an outer periphery;
a grommet in the form of a resilient tube, the grommet being fit externally on the flange; and
a slide lever including an operating portion and a slide cam projecting from the operating portion, the slide lever being supported in the housing and being configured to proceed with connection of the housing and the mating housing by sliding in the housing due to a pushing of the operating portion with the slide cam engaged with the mating housing; wherein:

the flange includes a recessed cut at an outer peripheral location proximate to the operating portion when the pushing of the operating portion is completed;

the grommet includes a part to be fit into the cut;

a pushing direction of the operating portion is set at a direction perpendicular to a connecting direction of the housing and the mating housing; and the slide lever includes a narrow portion located on a side of the operating portion and narrow in the connecting direction and a wide portion located on a side of body of the slide cam and wide in the connecting direction via a step extending in the connecting direction, and a front part of the wide portion in the connecting direction is inserted into a receptacle of the mating housing and the narrow portion is arranged to contact an opening end part of the receptacle of the mating housing when the connection of the housing and the mating housing is completed.

6. The connector of claim 5, wherein the part of the grommet to be fit into the cut is a thick portion thicker than surroundings portions of the grommet.

* * * * *